(12) United States Patent
Krishnapuram et al.

(10) Patent No.: US 9,118,759 B2
(45) Date of Patent: Aug. 25, 2015

(54) CUSTOMER SERVICE ANALYSIS

(75) Inventors: Raghuram Krishnapuram, New Delhi (IN); L. Venkata Subramaniam, Guragon (IN)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/855,944

(22) Filed: Aug. 13, 2010

(65) Prior Publication Data

US 2012/0039460 A1    Feb. 16, 2012

(51) Int. Cl.
*H04M 3/51* (2006.01)

(52) U.S. Cl.
CPC .............. *H04M 3/51* (2013.01); *H04M 3/5175* (2013.01)

(58) Field of Classification Search
CPC .. H04M 1/72569; H04M 3/5183; H04M 3/22
USPC ................ 379/265.06, 265.08, 265.05, 265.1
See application file for complete search history.

(56) References Cited

U.S. PATENT DOCUMENTS

| | | | |
|---|---|---|---|
| 6,700,971 B1 | 3/2004 | Cohen et al. | |
| 6,724,887 B1 | 4/2004 | Eilbacher et al. | |
| 6,970,831 B1 * | 11/2005 | Anderson et al. | 705/7.32 |
| 7,412,402 B2 * | 8/2008 | Cooper | 705/7.42 |
| 2002/0016727 A1 * | 2/2002 | Harrell et al. | 705/7 |
| 2006/0224437 A1 * | 10/2006 | Gupta et al. | 705/10 |
| 2007/0274502 A1 | 11/2007 | Brown | |
| 2008/0267386 A1 | 10/2008 | Cooper | |
| 2009/0003583 A1 | 1/2009 | Carretto et al. | |
| 2009/0192838 A1 | 7/2009 | Bangalore et al. | |

OTHER PUBLICATIONS

Ren, Z. Justin, and Zhou, Yong-Pin, "Call Center Outsourcing: Coordinating Staffing Level and Service Quality", July 7, 2006, abstract available at URL:http://papers.ssrn.com/sol3/papers.cfm?abstract_id=945278.

Khan, Mohammed; Dutt, Vippan Raj; and Bansal, S.C., "Customer Perceptions, Expectations and Gaps in Service Quality: An Empirical Study of Civil Aviation Industry in India", Research Paper, available at URL: http://icbm.bangkok.googlepages.com/06.Vippan.Dutt.PAR.pdf.

(Continued)

*Primary Examiner* — Amal Zenati
(74) *Attorney, Agent, or Firm* — Ference & Associates LLC

(57) ABSTRACT

A method, a system and a computer program product for analyzing customer service quality is disclosed. A plurality of customer call service quality parameters is identified using historical data. The plurality of customer call service quality parameters is quantified and correlated. The customer service quality is analyzed using the plurality of customer call service quality parameters. A repository is generated using the historical data of a plurality of customer calls and a set of pre-defined customer call flow templates. A subset of service quality queries is identified using contextual information of the customer call from the repository of service quality queries. The subset of service quality queries is then interspersed in the customer call. The customer service quality is analyzed using responses to the subset of service quality queries.

18 Claims, 3 Drawing Sheets

(56) References Cited

OTHER PUBLICATIONS

Nagarajan, K. V.; Tewoldeberhan, T. W.; Chavan, M.: and Vial. P. J., SIMCTS: A Simulation Based Approach to Understand and Manage Service Quality, available at URL: http://www.uow.edu.au/~/kv07/022.simo5.pdf.

Kumar, V.: Smart, P. A.,; Maddern, H.; and Maull R. S., "Alternative Perspectives on Service Quality and Customer Satisfaction: The Role of BPM", International Journal of Service Industry Management, vol. 19, No. 2, 2008, pp. 176-187, available at URL:http://www.eiasm.org/documents/JMW/jmp/715.pdf.

* cited by examiner

CUSTOMER SERVICE ANALYSIS

TECHNICAL FIELD

The present invention relates generally to analyzing customer service quality, and more particularly to customer call quality.

BACKGROUND

In industry, for example, the manufacturing sector, methods such as "six sigma", TQM, etc, have been used for quality improvement. Over the years, in many other sectors, a number of methods have been utilized for evaluating customer service quality. Some methods used are, for example, direct mail surveys, mystery shopping, telephone surveys, comment cards etc. Typically there are two groups of service gaps. One group of gaps is related to organizational performance, which includes market information gap, service standard gap, and internal communication gap. The second group is related to customer expectation and actual performance gap, and this gap is associated with performance of a human operator and communication skills. Quality in customer service is typically associated with customer satisfaction and hence is related, in turn, to customer retention and revenue.

BRIEF SUMMARY

Embodiments of the invention are directed to a method, a system and a computer program product for analyzing customer service quality. Accordingly, embodiments of the invention identify a plurality of customer call service quality parameters using historical data. Embodiments further quantify the plurality of customer call service quality parameters and correlate the quantified plurality of customer call service quality parameters. Embodiments further analyze the customer service quality using the plurality of customer call service quality parameters. According to other embodiments, a repository of service quality queries is generated using the historical data of a plurality of customer calls and a set of pre-defined customer call flow templates. Embodiments further identify a subset of service quality queries from the repository of service quality queries. Embodiments further intersperse the subset of service quality queries in a customer call using contextual information of the customer call, wherein the contextual information of the customer call includes metadata of the customer call and is determined using at least one technique selected from the set of pre-defined adaptive techniques and analyze the customer service quality using responses to the subset of service quality queries.

BRIEF DESCRIPTION OF THE SEVERAL VIEWS OF THE DRAWINGS

Embodiments of the invention are described below, by way of example only, with reference to the following schematic drawings, where.

DETAILED DESCRIPTION

Figure 1:
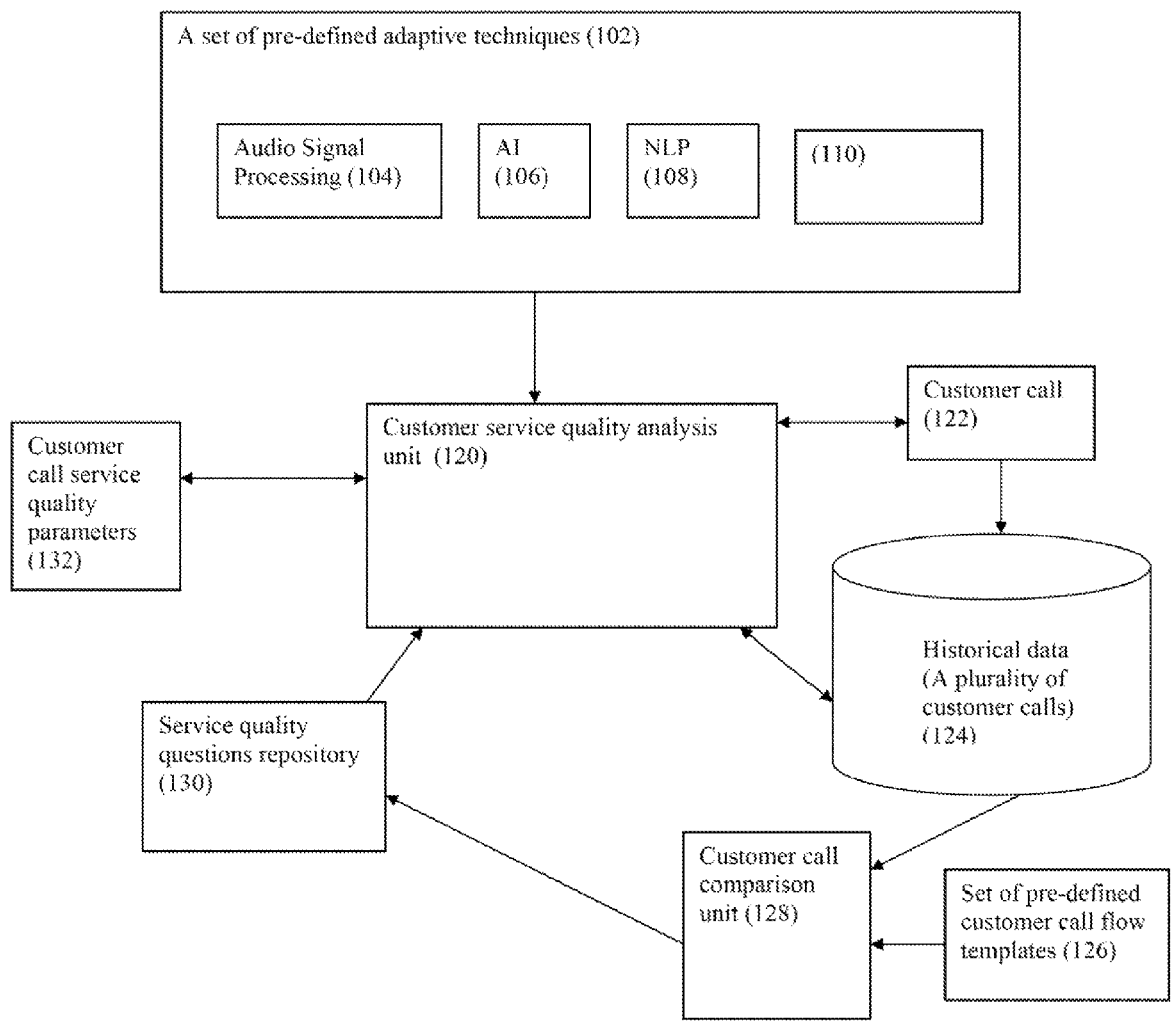
FIG. 1 shows a schematic of a mechanism of analyzing customer service quality in accordance with an exemplary embodiment of the invention.

Embodiments of the present invention relate to a method, a system and a computer program product for analyzing customer service quality. More specifically, embodiments of the present invention relate to dynamically and adaptively identifying, correlating service quality parameters and using them for analysis. Typical methods of customer service quality measurement and analysis may fall short of providing a comprehensive view needed for quality improvement. A mail or a telephone survey may be able to capture customer's general evaluation and may miss out on transaction specific information. Mystery shoppers and comment cards are capable of typically able to describe only a disproportionately small transaction set, which may not be representative enough.

A service organization can measure its performance based on service gaps of two types: Gap in organization performance (such as Market Information Gap, Service Standards Gap, Service Performance Gap, Internal Communications Gap) and Gap in customer expectation and actual performance (Service Quality Gap). Thus, service quality can be a qualitative and a quantitative measure of performance. A service organization can measure its overall performance by measuring the two types of gaps based on several parameters measured from customer interactions. These parameters include: Conversion (successful, partially successful, unsuccessful), AHT (Average Call Handling Time), C-SAT (interaction rated on a scale by customer), EDR (Expressed Dissatisfaction rate), FCR Rate (First Call Resolution Rate), Net Promoter Score (Customer loyalty measure), Call flow (opening with correct greeting, covering all aspects during the call, giving/taking proper and complete information, following mandatory processes), Communication Skills (effective listening, personalized interaction with the customer, courteous, polite, professional, clarity in speech, good pacing, proper voice inflection, pronunciation, confidence).

Call centers usually collect such data. But often it may not clear how these parameters affect service quality. Often these parameters are correlated and to improve the call service quality these correlations must be explicitly brought out (for example AHT has a direct correlation with call flow and both of these affect the call service quality in different ways). One way is to measure the parameters from the collection of calls. This could be done by aggregating all the calls or a large subset of the total calls. From these calls it is possible to find a subset of calls based on various criteria like those that deviate from the normal patterns to identify parameters that affect customer expectation from the service organization.

Organization performance parameters could be used as an initial set of customer expectation, for example, such as, AHT and FCR may be found to be important for customer in an exemplary case. If these are deemed to be important enough, then their optimal range may be found. Some of the service parameters are available as metadata attached to a call. For example, the call duration, what specific actions resulted from the call, success/failure of a call, etc. are available in the form of metadata. These parameters could be captured while the call is in progress and stored as meta-information attached to a call and stored in a database.

However, other service parameters need to be obtained by analyzing the customer calls. For example, whether the call agent followed the prescribed call flow has to be determined by comparing segments of actual calls with the prescribed call flow. The prescribed call flow is a pre-defined customer call flow template. This can be done manually by listening to the calls and isolating calls where the prescribed call flow, stored as the pre-defined customer call flow template, are not followed. It can also be done in an automated way using multiple techniques. These include artificial intelligence based techniques, machine learning techniques, natural language processing techniques, statistical techniques and audio signal processing techniques. Similarly the communication skills of call agents can be assessed using these techniques. It could be determined, in an exemplary mode and not limited to, if the call agents are talking too fast, or if are they being courteous, or did they ask mandatory queries.

FIG. 1 shows a schematic 100 of a mechanism for analyzing customer service quality according to an exemplary embodiment of the invention. Schematic 100 shows a set of pre-defined adaptive techniques 102, a customer service quality analysis unit 120, a historical data unit 124 and a customer call comparison unit 128. Set of pre-defined adaptive techniques 102 is shown to include exemplary techniques, such as, an audio signal processing unit 104, an Artificial Intelligence (AI) unit 106, a Natural Language Processing (NLP) unit 108, and another exemplary unit 110, which for example, in one embodiment could be statistical technique unit etc. Customer service quality analysis unit 120 identifies a plurality of customer call service quality parameters using historical data unit 124. Customer call service quality parameters unit 132 is an exemplary unit storing the identified plurality of customer call service quality parameters. The plurality of customer call service quality parameters may include, in an exemplary manner, Average call Handling Time (AHT), Expressed Dissatisfaction Rate (EDR), First Call Resolution rate (FCR rate), customer loyalty measure, call flow and communication skills. Customer service quality analysis unit 120 also quantifies the plurality of customer call service quality parameters and correlates the quantified plurality of customer call service quality parameters using at least one technique selected from a set comprising artificial intelligence based techniques, machine learning techniques, natural language processing techniques, statistical techniques and audio signal processing techniques. Customer service quality analysis unit 120 further analyzes the customer service quality using the plurality of customer call service quality parameters.

Once it is determined, for example, that AHT is adversely affecting customer ratings, specific queries may be framed to find out what is the ideal handling time. This is done by interspersing queries in the call. Random Queries can be interspersed in the call and can be identified automatically by spotting it in the call along with its answer. An exemplary query interspersed in the customer call is given below:

Agent: Sir I took 12 minutes to respond to your queries in this call. Do you think this time is ideal?
Customer: No you took too long.
Agent: Sir how many minutes would be ideal
Customer: About 8 minutes By aggregating answers from multiple calls, the optimal AHT can be arrived at. While this is a simple example, interspersed queries can gather a lot of information about call service quality. The customer calls are interspersed (selected randomly or using specific criteria) with queries to identify customer call service quality parameters affecting customer expectation and find ideal values for the parameters. Some exemplary queries are given below:

Have you called us before?
How many calls did it take to get your problem resolved? What was your expectation?
Sir in this call I took 12 minutes to resolve your problem? What do you think would have been the ideal time?

The specific criteria can include the specific context of a call based on which the decision on what queries to ask whom can be arrived at. Not every query needs to be asked of every caller. Determination and selection of queries can be based on context determined using the techniques listed in 102. In an exemplary mode, for a customer calling regarding a web transaction will not be asked queries related to phone based customer service.

A customer call comparison unit 128 generates service quality queries using a comparison of a plurality of customer calls stored in historical data unit 124 and a set of pre-defined customer call flow templates stored in a set of pre-defined customer call flow templates unit 126. The service quality queries are stored in a repository of service quality queries 130. The comparison includes, in an exemplary mode, comparing typical customer calls transcripts as well as atypical call transcripts. Once the repository 130 is populated, a subset of service quality queries from repository 130 is identified using at least one technique selected from a set of pre-defined adaptive techniques. Customer service quality analysis unit 120 intersperses the subset of service quality queries in a customer call 122 using contextual information of customer call 122. Customer service quality analysis unit 120 analyzes the customer service quality using responses to the subset of service quality queries.

Figure 2:
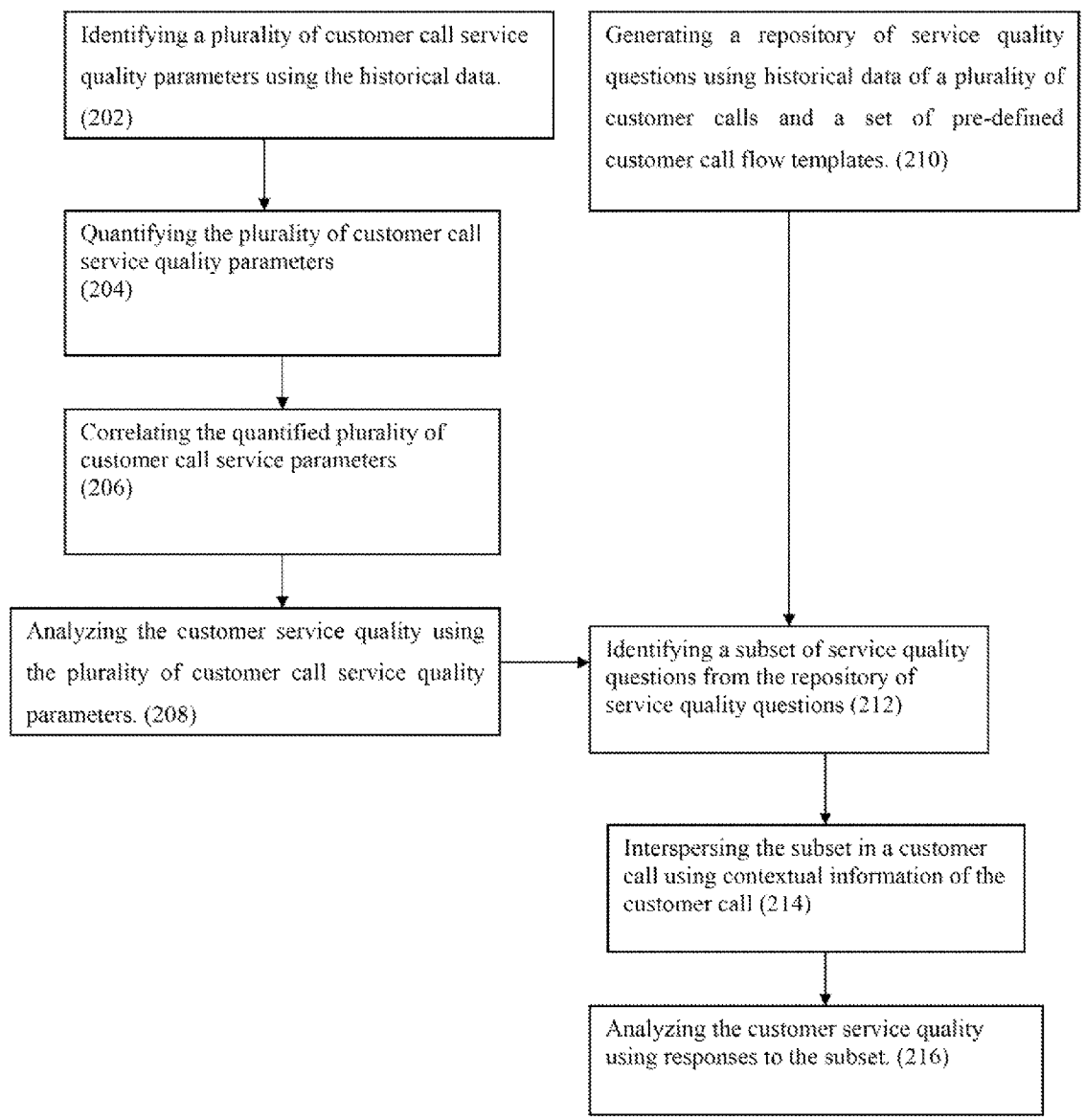
FIG. 2 shows a flow chart of a method for analyzing customer service quality as disclosed in an exemplary embodiment of the invention.

FIG. 2 shows a flow chart of a method 200 for analyzing customer service quality as disclosed in one embodiment of the invention. Step 202 depicts defining/identifying a plurality of customer call service quality parameters using contextual information of the customer call.

Step 204 shows quantifying the plurality of customer call service quality parameters. Step 206 depicts correlating the quantified plurality of customer call quality service parameters. After obtaining the parameters it is necessary to find how the customer call service quality parameters are related to each other and how they affect service quality. These associations between the various parameters define the specific context of a call. In an exemplary mode, if the AHT is very long the customer may give a poor rating. In yet another exemplary mode, an association between low FCR and customer attrition may be discovered. This step can be implemented using at least one technique selected from a set including artificial intelligence based techniques, machine learning techniques, natural language processing techniques, statistical techniques and audio signal processing techniques.

Step 208 shows analyzing the customer service quality using the plurality of customer service quality parameters. For example, using the plurality of customer service quality parameters to obtain other service parameters of the current call by analyzing the customer calls, such as, whether the call agent followed the prescribed call flow has to be determined by comparing segments of actual calls with the prescribed call flow. The prescribed call flow is a pre-defined customer call flow template. This can be done manually by listening to the calls and isolating calls where the prescribed call flow, stored as the pre-defined customer call flow template, are not followed. It can also be done in an automated way using multiple techniques, such as artificial intelligence based techniques, machine learning techniques, natural language processing techniques, statistical techniques and audio signal processing techniques, etc. Similarly the communication skills of call agents can be assessed by analyzing the customer service quality using the plurality of customer service quality parameters; other analysis, such if the call agents are talking too fast, or if are they being courteous, or did they ask mandatory queries, each call evaluation, etc can be analyzed using the plurality of customer service quality parameters. The analyzing step can be done in various ways by using existing technology, such as evaluation each call's service quality by classification, get the call with good service quality or bad service quality by clustering, and also, any new analyzing method can be used here.

Step 210 depicts generating a repository of service quality queries using historical data, for a call center, a plurality of customer calls and a set of pre-defined customer call flow templates can be used to generating the repository of service quality queries. In one embodiment, the repository may be a structured data. In other embodiment the repository may be unstructured data.

Measurement of the parameters from the collection of calls could be done by aggregating all the calls or a large subset of the total calls. From these calls it is possible to find a subset of calls based on various criteria like those that deviate from the normal patterns to identify parameters that affect customer expectation from the service organization.

Call centers usually collect such data and also get the response from the customer whether he/she is satisfied for a specific call. But often it may not clear for a call centers how these parameters affect service quality. Often these parameters are correlated and to improve the call service quality these correlations must be explicitly brought out (for example AHT has a direct correlation with call flow and both of these affect the call service quality in different ways). In this invention, the call center will identify the important parameters by querying customer some questions.

Step 212 shows identifying a subset of service quality queries using contextual information of the customer call from a repository of service quality queries. Analysis of the customer service quality based on the plurality of customer call service quality parameters, which is performed in step 208, is used to obtain the contextual information of the customer call. In an exemplary mode if AHT, amongst others, is determined to be adversely affecting customer ratings, specific queries may be framed to find out what is the ideal handling time. Step 208 as well as step 212, both are performed by customer service quality analysis unit 120 of FIG. 1. The service quality queries related to a call context may be stored in the repository beforehand. This kind of information can be obtained by experience or by historical data using at least one technique selected from a set of pre-defined adaptive techniques. The set of pre-defined adaptive techniques comprises artificial intelligence based techniques, machine learning techniques, natural language processing techniques, statistical techniques and audio signal processing techniques. Step 214 depicts interspersing the subset of service quality queries in a customer call. This step can be done when a customer call nearly finish, or initiate by an agent. Step 216 shows analyzing the customer service quality using responses to the subset of service quality queries.

Figure 3:
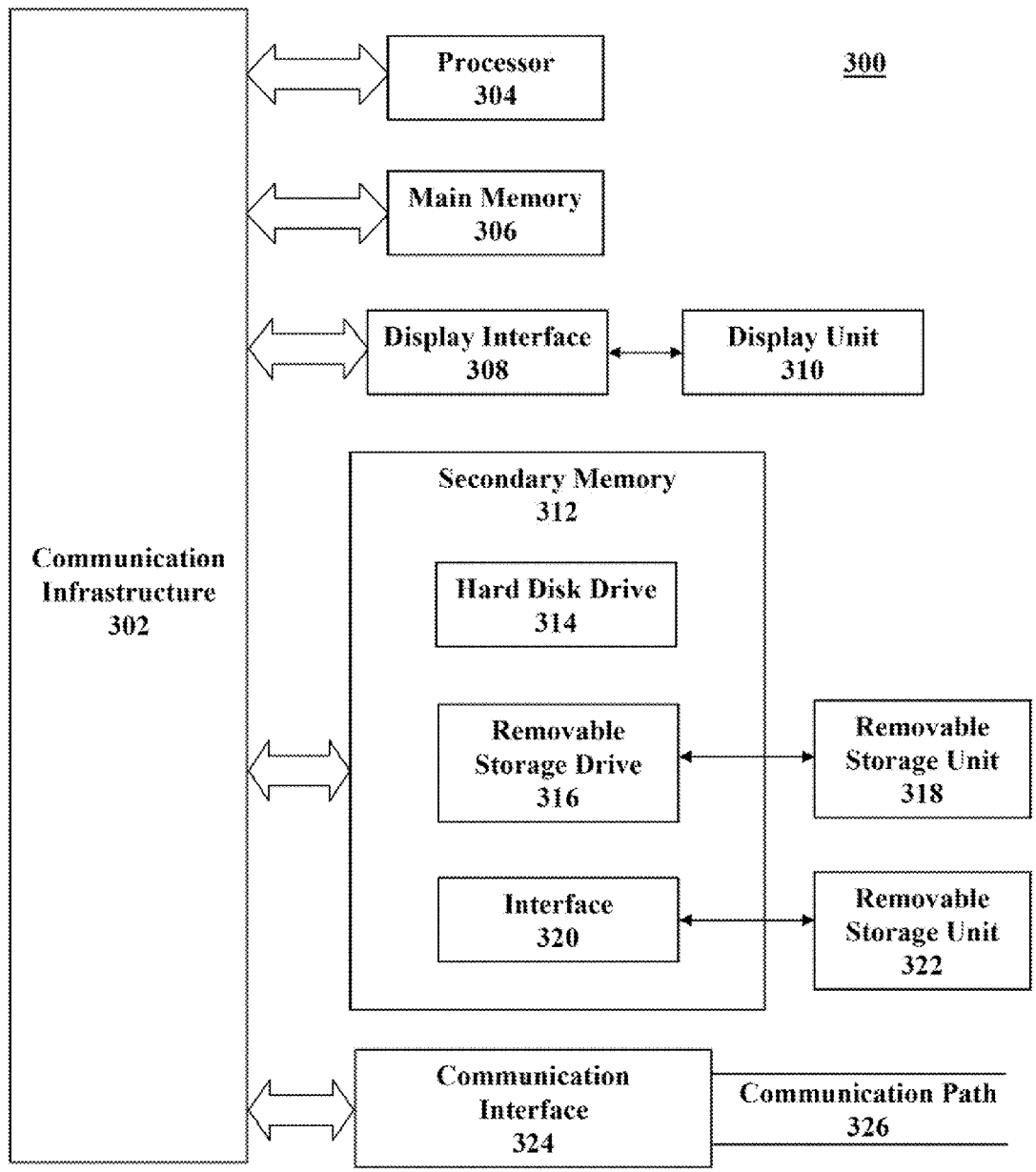
FIG. 3 shows an exemplary schematic of a computer system used for analyzing customer service quality as disclosed in FIGS. 1 and 2.

FIG. 3 is a block diagram of an exemplary computer system 300 that can be used for implementing various embodiments of the present invention. In some embodiments, the computer system 300 can be used as customer service quality analysis unit 120 of FIG. 1, adapted to analyze customer service quality as disclosed in FIG. 1. The computer system 300 can also be used to perform the steps described in FIG. 2. The Computer system 300 includes a processor 304. It should be understood although FIG. 3 illustrates a single processor, one skilled in the art would appreciate that more than one processor can be included as needed. The processor 304 is connected to a communication infrastructure 302 (for example, a communications bus, cross-over bar, or network) where the communication infrastructure 304 is configured to facilitate communication between various elements of the exemplary computer system 300. Various software embodiments are described in terms of this exemplary computer system. After reading this description, it will become apparent to a person of ordinary skill in the relevant art(s) how to implement the invention using other computer systems and/or computer architectures.

Exemplary computer system 300 can include a display interface 308 configured to forward graphics, text, and other data from the communication infrastructure 302 (or from a frame buffer not shown) for display on a display unit 310. The computer system 300 also includes a main memory 306, which can be random access memory (RAM), and may also include a secondary memory 312. The secondary memory 312 may include, for example, a hard disk drive 314 and/or a removable storage drive 316, representing a floppy disk drive, a magnetic tape drive, an optical disk drive, etc. The removable storage drive 316 reads from and/or writes to a removable storage unit 318 in a manner well known to those having ordinary skill in the art. The removable storage unit 318, represents, for example, a floppy disk, magnetic tape, optical disk, etc. which is read by and written to by the removable storage drive 316. As will be appreciated, the removable storage unit 318 includes a computer usable storage medium having stored therein computer software and/or data.

In exemplary embodiments, the secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to the computer system 300.

The computer system 300 may also include a communications interface 324. The communications interface 324 allows software and data to be transferred between the computer system and external devices. Examples of the communications interface 324 may include a modem, a network interface (such as an Ethernet card), a communications port, a PCMCIA slot and card, etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. These propagated signals are provided to the communications interface 324 via a communications path (that is, channel) 326. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention further provide a storage medium tangibly embodying a program of machine-readable instructions executable by a digital processing apparatus to carry out a method of analyzing customer service quality as described in the various embodiments set forth above and described in detail.

Advantages of various embodiments of the invention include improved performance in customer call service quality and potential to increase revenue. Advantages of various embodiments of the invention further include retention of customers, potentially improved loyalty of customers, high agent productivity and high customer satisfaction. Although the invention explains various advantages of the specific embodiments of the invention, those skilled in the art will appreciate from the teaching of the embodiments that the advantages of the invention are not limited to the above mentioned.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method for analyzing customer service quality, the method comprising:
   conducting a customer call;
   during a customer call between an agent and a customer, automatically determining contextual information relating to the call, the contextual information comprising metadata for service parameters of the call;
   said determining being performed using at least one technique selected from a set of pre-defined adaptive techniques;
   consulting a repository of service quality queries;
   obtaining, from the repository, a subset of service quality queries relating to the determined contextual information;
   interspersing the subset of service quality queries in the customer call for the agent to ask of the customer;
   providing responses thereupon obtained from the customer to the subset of service quality queries as a basis for analysis of customer service quality; and
   analyzing customer service quality, relating at least to the customer call, using the obtained responses.

2. The method of claim 1, wherein the set of pre-defined adaptive techniques comprises at least one of artificial intelligence based techniques, machine learning techniques, natural language processing techniques, statistical techniques and audio signal processing techniques.

3. The method of claim 1, further comprising:
   generating the repository of service quality queries using historical data of a plurality of customer calls and a set of pre-defined customer call flow templates.

4. The method of claim 3, wherein said determining comprises using a plurality of customer call service quality parameters to obtain the contextual information of the customer call.

5. The method of claim 4, further comprising:
   identifying the plurality of customer call service quality parameters using the historical data;
   quantifying the plurality of customer call service quality parameters; and
   correlating the quantified plurality of customer call service quality parameters.

6. The method of claim 4, wherein the plurality of customer call service quality parameters comprises at least one of Average call Handling Time (AHT), Expressed Dissatisfaction Rate (EDR), First Call Resolution rate (FCR rate), customer loyalty measure, call flow and communication skills.

7. The method of claim 5, the step of correlating includes:
   correlating the quantified plurality of customer call service quality parameters using at least one technique selected from a set comprising artificial intelligence based techniques, machine learning techniques, natural language processing techniques, statistical techniques and audio signal processing techniques.

8. A system of analyzing customer service quality, the system comprising at least one processor and at least one memory, wherein the processor is adapted to:
   during a customer call between an agent and a customer, automatically determine contextual information relating to the call, the contextual information comprising metadata for service parameters of the call;
   wherein the determining is performed using at least one technique selected from a set of pre-defined adaptive techniques;
   consult a repository of service quality queries;
   obtain, from the repository, a subset of service quality queries relating to the determined contextual information;
   intersperse the subset of service quality queries in the customer call for the agent to ask of the customer;
   provide responses thereupon obtained from the customer to the subset of service quality queries as a basis for analysis of customer service quality; and
   analyze customer service quality, relating at least to the customer call, using the obtained responses.

9. The system of claim 8, wherein the set of pre-defined adaptive techniques comprises at least one of artificial intelligence based techniques, machine learning techniques, natural language processing techniques, statistical techniques and audio signal processing techniques.

10. The system of claim 9, wherein the processor is further adapted to:
    generate the repository of service quality queries using historical data of a plurality of customer calls and a set of pre-defined customer call flow templates.

11. The system of claim 10, wherein the processor is further adapted to undertake the determination of contextual information via using a plurality of customer call service quality parameters to obtain the contextual information of the customer call.

12. The system of claim 11, wherein the plurality of customer call service quality parameters comprises at least one of Average call Handling Time (AHT), Expressed Dissatisfaction Rate (EDR), First Call Resolution rate (FCR rate), customer loyalty measure, call flow and communication skills.

13. The system of claim 11, wherein the processor is further adapted to:
    identify the plurality of customer call service quality parameters using the historical data;
    quantify the plurality of customer call service quality parameters; and
    correlate the quantified plurality of customer call service quality parameters using at least one technique selected from a set comprising artificial intelligence based techniques, machine learning techniques, natural language processing techniques, statistical techniques and audio signal processing techniques.

14. A computer program product for data management, the computer program product comprising:
    a non-transitory computer readable storage medium having computer readable program code embodied therewith, the computer readable program code comprising computer readable program code configured to:
    during a customer call between an agent and a customer, automatically determine contextual information relating to the call, the contextual information comprising metadata for service parameters of the call;
    wherein the determining is performed using at least one technique selected from a set of pre-defined adaptive techniques;

consult a repository of service quality queries;

obtain, from the repository, a subset of service quality queries relating to the determined contextual information;

intersperse the subset of service quality queries in the customer call for the agent to ask of the customer;

provide responses thereupon obtained from the customer to the subset of service quality queries as a basis for analysis of customer service quality; and analyze customer service quality, relating at least to the customer call, using the obtained responses.

15. The computer program product of claim 14, wherein the set of pre-defined adaptive techniques comprises at least one of artificial intelligence based techniques, machine learning techniques, natural language processing techniques, statistical techniques and audio signal processing techniques.

16. The computer program product of claim 14, further configured to:

generate the repository of service quality queries using historical data of a plurality of customer calls and a set of pre-defined customer call flow templates.

17. The computer program product of claim 14, further configured to undertake the determination of contextual information via using a plurality of customer call service quality parameters to obtain the contextual information of the customer call.

18. The computer program product of claim 17, further configured to:

identify the plurality of customer call service quality parameters using the historical data, wherein the plurality of customer call service quality parameters comprises at least one of Average call Handling Time (AHT), Expressed Dissatisfaction Rate (EDR), First Call Resolution rate (FCR rate), customer loyalty measure, call flow and communication skills;

quantify the plurality of customer call service quality parameters; and correlate the quantified plurality of customer call service quality parameters using at least one technique selected from a set comprising artificial intelligence based techniques, machine learning techniques, natural language processing techniques, statistical techniques and audio signal processing techniques.

* * * * *